(12) United States Patent
Kim

(10) Patent No.: US 7,274,743 B2
(45) Date of Patent: Sep. 25, 2007

(54) METHODS FOR MINIMIZING SETUP TIME BY OPTIMIZING BIT ALLOCATION IN MULTI-CHANNEL COMMUNICATION SYSTEM

(75) Inventor: Yong-Woon Kim, Suwon-shi (KR)

(73) Assignee: Samsung Electronics, Co., Ltd., Suwon (KR)

( * ) Notice: Subject to any disclaimer, the term of this patent is extended or adjusted under 35 U.S.C. 154(b) by 742 days.

(21) Appl. No.: 10/388,117

(22) Filed: Mar. 13, 2003

(65) Prior Publication Data
US 2003/0185311 A1 Oct. 2, 2003

(30) Foreign Application Priority Data
Mar. 28, 2002 (KR) ............... 2002-17084

(51) Int. Cl.
*H04L 27/28* (2006.01)
(52) U.S. Cl. .................................... 375/260
(58) Field of Classification Search ........... 375/222, 375/377, 219, 259–261, 268, 285; 704/229, 704/200, 201; 702/69, 66, 57.1; 455/557; 379/93.01, 283, 339; 370/302
See application file for complete search history.

(56) References Cited

U.S. PATENT DOCUMENTS

| | | | | |
|---|---|---|---|---|
| 5,479,447 A | | 12/1995 | Chow et al. | |
| 5,642,383 A | * | 6/1997 | Suzuki | 375/241 |
| 5,812,599 A | * | 9/1998 | Van Kerckhove | 375/260 |
| 5,822,374 A | * | 10/1998 | Levin | 375/260 |
| 5,832,387 A | * | 11/1998 | Bae et al. | 455/522 |
| 5,852,633 A | * | 12/1998 | Levin et al. | 375/130 |
| 5,903,608 A | * | 5/1999 | Chun | 375/260 |
| 6,084,917 A | | 7/2000 | Kao et al. | |
| 6,222,888 B1 | | 4/2001 | Kao et al. | |
| 2001/0031016 A1 | | 10/2001 | Seagraves | |
| 2002/0009155 A1 | * | 1/2002 | Tzannes | 375/260 |

OTHER PUBLICATIONS

"A Practical Discrete Multitone Transceiver Loading Algorithm for Data Transmission over Spectrally Shaped Channels" IEEE Transactions on Communications, vol. 43, No. 2/4, part 2, New York, US - Feb./Apr., 1995.

French International Search Report FR 0303872 FA 633142 - Apr. 20, 2007.

\* cited by examiner

*Primary Examiner*—Jay K. Patel
*Assistant Examiner*—Vineeta Panwalkar
(74) *Attorney, Agent, or Firm*—F. Chau & Associates, LLC

(57) ABSTRACT

Methods for bit allocation and power tuning for optimizing a setup time in a multi-channel communication system. In one aspect, a bit allocation method includes measuring a signal-to-noise ratio (SNR) of each subchannel of a channel, determining a greatest allocable bit number of each subchannel using the measured SNR of the subchannels, determining a sum of the greatest allocable bit numbers of the subchannels, and determining a difference between the sum of the greatest allocable bit numbers of the subchannels and a target bit number. The currently allocated bit numbers of one or more subchannels is adjusted until a sum of the currently allocated bit numbers is equal to the target bit number.

18 Claims, 5 Drawing Sheets

METHODS FOR MINIMIZING SETUP TIME BY OPTIMIZING BIT ALLOCATION IN MULTI-CHANNEL COMMUNICATION SYSTEM

CROSS-REFERENCE TO RELATED APPLICATION

This application claims priority to Korean Patent Application No. 2002-17084, filed on Mar. 28, 2002, which is incorporated herein by reference.

TECHNICAL FIELD OF THE INVENTION

The present invention relates to methods for bit allocation in a data communications system and, in particular, to bit allocation methods that minimize setup times by optimizing the bit allocations for a plurality of channels in high-speed rate adaptive communication system.

BACKGROUND

In recent years, due to the requirements for high-speed communications on networks such as the Internet and the wide spread use of personal computers, communication methods that provide high-speed data communications and minimize installation costs and user fees have become imperative. As a result, Digital Subscriber Line and variations thereof (xDSL) have been proposed. Advantageously, xDSL enables digital data communications using existing infrastructure such as copper phone lines installed in homes and offices.

In general, "xDSL" refers to all types of communication methods using phone lines, and includes High data-rate DSL (HDSL) which is replacing existing T1 lines, Symmetric DSL (SDSL) which is replacing T1 or E1 lines by using a single twisted-pair copper lines, and Asymmetric DSL (ADSL) which is capable of transmitting high-capacity data using a public switched telephone network (PSTN).

In general, a data communications system includes a central office and a plurality of remote terminals. Each remote terminal communicates with the central office over a data link, i.e., a channel that is established between the central office and the remote terminal. To establish the data link, an initialization process is performed to initialize communications between the central office and each of the remote terminals. For this, the central office includes a central modem and the remote terminal includes a remote modem. These modems are transceivers for facilitating data transmission between the central office and a remote terminal.

An initialization process for a multi-channel communication system generally includes operations such as activation and acknowledgment of initialization requests, transceiver training at both the central office and a remote terminal, exchange of rate requests between the central office and a remote terminal, channel analysis, and exchange of transmitter settings (i.e., bit allocation tables) between the central office and a remote terminal.

In a multi-channel communication system such as an ADSL system, a plurality of channels (e.g., frequency tones) are used to transmit data between the central office and a remote terminal, and the initialization process is performed using conventional protocols such as the T1E1 ADSL Standard, which describes an initialization process that is implemented by transceivers. An initialization process of an ADSL system is disclosed, for example, in U.S. Pat. No. 6,249,543 entitled "PROTOCOL FOR TRANSCEIVER INITIALIZATION" by Chow.

In the initialization process of a multi-channel communication system, the number of bits that are allocated or loaded to each subchannel is typically calculated based on a signal to noise ratio (hereinafter referred to as "SNR").

Currently, there are various bit allocation algorithms that are widely used. For instance, Chow describes a bit allocation protocol that performs a basic bit allocation in a measured system SNR using a SNR gap and a desired system margin. The margin is adjusted such that the calculated bit number is equal to the desired total bit number. If the desired total bit number is more than the current bit number, the bit number of a subchannel whose margin is the minimum is decreased by using a margin function derived from a bit loading algorithm. On the other hand, if the desired total bit number is less than the current bit number, the bit number of a subchannel whose margin is the maximum is increased by one. The Chow algorithm makes it easy to calculate times or margins due to simplicity of the bit allocation method. However, because the algorithm is made under the assumption that the number of subchannels that are used is always the same, the protocol does not provide optimized bit loading.

A second known bit loading protocol uses a target system SNR to provide an optimized bit allocation scheme. This algorithm performs a bit loading using a system SNR and a noise figure. After setting a sufficient system margin, the bit loading is performed. A bit allocation is performed using the present margin function by increasing one by one the bit number of a subchannel whose margin is the maximum. When the obtained total bit number is different from the desired total bit number, the present data rate approximates to the desired data rate by increasing or decreasing the bit number one by one using the margin function. Consequently, because the bit loading is performed by one bit, the number of calculations and performance time is greatly increased.

A third known bit allocation protocol is one where bit loading is performed using a target system SNR and a noise figure. This protocol algorithm is based on the second protocol described above. But, after dividing the SNR into the noise figure in an initialization allocation, an existing bit loading algorithm is performed. However, the number of calculations cannot be neglected in digital signal processing (DSP).

SUMMARY OF THE INVENTION

The present invention is directed to methods for performing bit allocation in a multi-channel communications system, which provide a reduction in the number of calculations and performance time, as compared to conventional methods. The invention is further directed to methods for fine-tuning the transmission power of one or more subchannels to make the system margin of each subchannel the same (or substantially the same).

In one aspect of the invention, a bit allocation method comprises measuring a signal-to-noise ratio (SNR) of each subchannel of a channel, determining a greatest allocable bit number of each subchannel using the measured SNR of the subchannels, determining a sum of the greatest allocable bit numbers of the subchannels, and determining a difference between the sum of the greatest allocable bit numbers of the subchannels and a target bit number. For each subchannel, a currently allocated bit number of the subchannel is set equal to the greatest allocable bit number of the subchannel, if the difference between the sum of the greatest allocable bit numbers and the target bit number is less than or equal to a predetermined value. On the other hand, for each subchannel, a currently allocated bit number of the subchannel is set to a value that is reduced from the greatest allocable bit number of the subchannel by a predetermined ratio, if the difference between the sum of the greatest allocable bit numbers and the target bit number is greater than the predetermined value. The currently allocated bit numbers of one or more subchannels is adjusted until a sum of the currently allocated bit numbers is equal to the target bit number.

In another aspect of the invention, the step of adjusting the currently allocated bit number of one or more subchannels comprises, for each subchannel, determining a margin of the subchannel using the currently allocated bit number and the SNR of the subchannel and comparing the sum of the currently allocated bit numbers with the target bit number. If the sum of the currently allocated bit numbers is greater than the target bit number, the subchannel having the smallest margin is selected and the number of the currently allocated bits of the selected subchannel is reduced by 1.

In yet another aspect of the invention, the step of adjusting the currently allocated bit number of one or more subchannels comprises, for each subchannel, determining a margin of the subchannel using the currently allocated bit number and the SNR of the subchannel and comparing the sum of the currently allocated bit numbers with the target bit number. If the sum of the currently allocated bit numbers is less than the target bit number, the subchannel having the greatest margin is selected and the number of the currently allocated bits of the selected subchannel is increased by 1.

In another aspect of the invention, when the sum of the currently allocated bit numbers is equal to the target bit number, the method further comprises the steps of determining an average margin of the subchannels and for each subchannel, and determining a transmission gain coefficient of the subchannel using a difference measure between the margin of the subchannel and the average margin of the subchannels. The transmission power of one or more subchannels can be adjusted using the transmission gain coefficient of the subchannel to make a margin of each of the subchannels substantially conformal.

In yet another aspect of the invention, a method for performing bit allocation in a multi-channel communication system comprises the steps of measuring a signal-to-noise ratio (SNR) of each subchannel of a channel, determining a greatest allocable bit number of each subchannel using the measured SNR of the subchannels, determining a sum of the greatest allocable bit numbers of the subchannels and determining a difference between the sum of the greatest allocable bit numbers of the subchannels and the target bit number. The method further comprises adjusting a system margin, if the difference between the sum of the greatest allocable bit numbers and the target bit number is more than a predetermined value, determining a currently allocated bit number for each subchannel using the system margin, and adjusting the currently allocated bit number of one or more subchannels until a sum of the currently allocated bit numbers of the subchannels is equal to the target bit number.

These and other aspects, features and advantages of the invention will be described and become apparent from the following detailed description of preferred embodiments, which is to be read in connection with the accompanying drawings.

DETAILED DESCRIPTION OF PREFERRED EMBODIMENTS

The present invention is directed to methods for performing bit allocation in a multi-channel communications system, which provide a reduction in the number of calculations and performance time, as compared to conventional methods. The invention is further directed to methods for fine-tuning the transmission power of one or more subchannels to make the system margin of each subchannel the same (or substantially the same).

Figure 1:
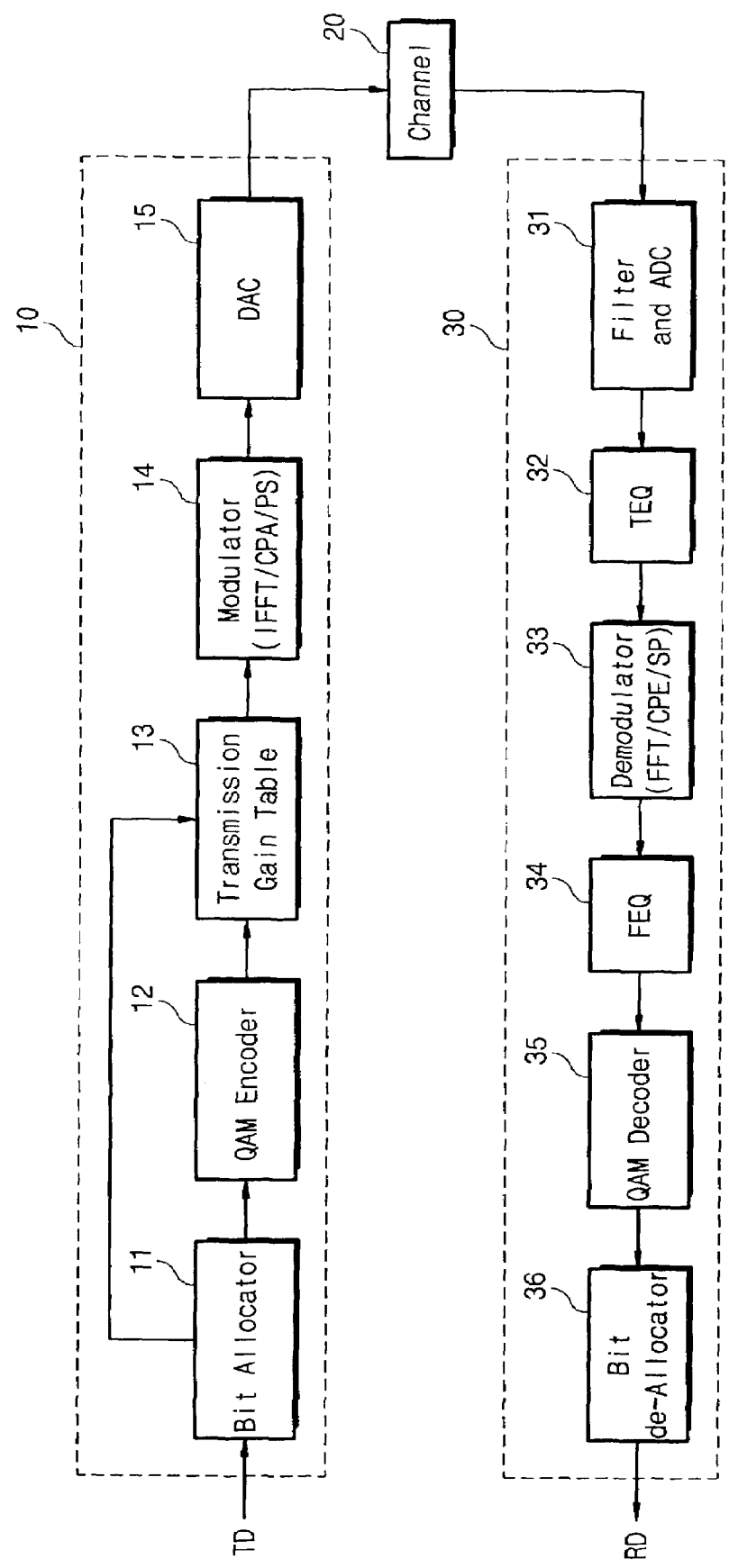
FIG. 1 is a schematic diagram illustrating a transmitter and receiver of a multi-channel communication system.

FIG. 1 is a schematic diagram illustrating a transmitter and a receiver of a multi-channel communication system. The system generally comprises a transmitter 10 and a receiver 30 which transmit and receive data over communication channel 20. The transmitter 10 includes a bit allocator 11, a QAM (Quadrature Amplifier Modulation) encoder 12, a transmission gain table 13, a modulator 14, and a digital-to-analog converter 15.

According to the T1E1.413 ADSL standard, a line code scheme called DMT (Discrete Multi-Tone) is used, which divides the spectrum from 4 kHz to 1.1 MHz into 255 4.3125 kHz subchannels. The bit allocator 11 determines the bit number of data that will be transmitted by each subchannel. The bit allocator 11 may be implemented using a data processing device such as a DSP (Digital Signal Processor). The QAM encoder 12 converts the transmitting data generated from the bit allocator 11 into QAM data. The transmission gain table 13 controls the transmitting power of the QAM data of each subchannel by using transmitting gains stored in the transmission gain table 13. The modulator 14 receives data from the QAM encoder 12 and sequentially performs IFFT (inverse fast Fourier transform), addition of a cyclic prefix, and parallel-to-serial conversion. The digital-to-analog converter 15 converts digital data generated from the modulator 14 into an analog signal to transmit the analog signal through a channel 20. A detailed description of modes of operation of the bit allocator 11 and the transmission gain table 13 according to preferred embodiments of the invention will be described in detail below.

The receiver 30 includes a filter and analog-to-digital converter (ADC) 31, a time-domain equalizer (TEQ) 32, a demodulator 33, a frequency-domain equalizer (FEQ) 34, a QAM decoder 35, and a bit de-allocator 36. The filter and analog-to-digital converter 31 filters an analog signal received from the channel 20 to convert the analog signal into a digital signal. The demodulator 33 receives data from the filter and analog-to-digital converter 31 and the TEQ 32, and sequentially performs serial-to-parallel conversion, removal of a cyclic prefix, and FFT (fast Fourier transform). The data generated by the demodulator 33 is in a frequency domain, and the amplitude and phase of the data are distorted by a frequency characteristic of a communication channel. The distorted data are corrected by the FEQ 34, and the corrected data are input into QAM decoder 35. The QAM decoder 35 receives the corrected data to perform QAM decoding. The bit de-allocator 36 de-allocates data of each subchannel generated from the QAM decoder 35 to the original data.

In an ADSL or a VDSL system, there is a significant difference between the desired data rate and the data rate that is obtainable from the system SNR. The desired data rate is always less than the data rate obtainable from the system SNR to meet a target system margin. If the target bit number according to the desired data rate is $B_{target}$ and the total bit number obtainable from the system SNR is $B_{max}$, $B_{max}$ is always greater than or equal to $B_{target}$ ($B_{max} \geq B_{target}$). The target bit number is variable to ranks of users.

In particular, when using conventional bit allocation schemes as described herein, when $B_{max} >> B_{target}$, it takes a considerable amount of calculations times to make $B_{max}$ closer to $B_{target}$ to maintain a system margin as uniform as possible. Assuming that the SNR for the $i^{th}$ subchannel is $SNR_i$, a SNR gap is $\Gamma$, and a target system margin is $Y_m$, the allocated bit number $b_i$ of the $i^{th}$ subchannel is preferably defined as follows:

$$b_i = \log_2\left(1 + \frac{SNR_i}{\Gamma \gamma_m}\right), i = 0, 1, 2, \cdots N \quad (1)$$

where N+1 is equal to the number of subchannels (e.g., N+1=255) and the allocated bit number $b_i$ of each of the subchannels is an integer. $B_{max}$ is the sum of the allocated bits of each subchannel, $B_{max}$ is preferably defined as follows:

$$B_{max} = \sum_i b_i \quad (2)$$

Figure 2:
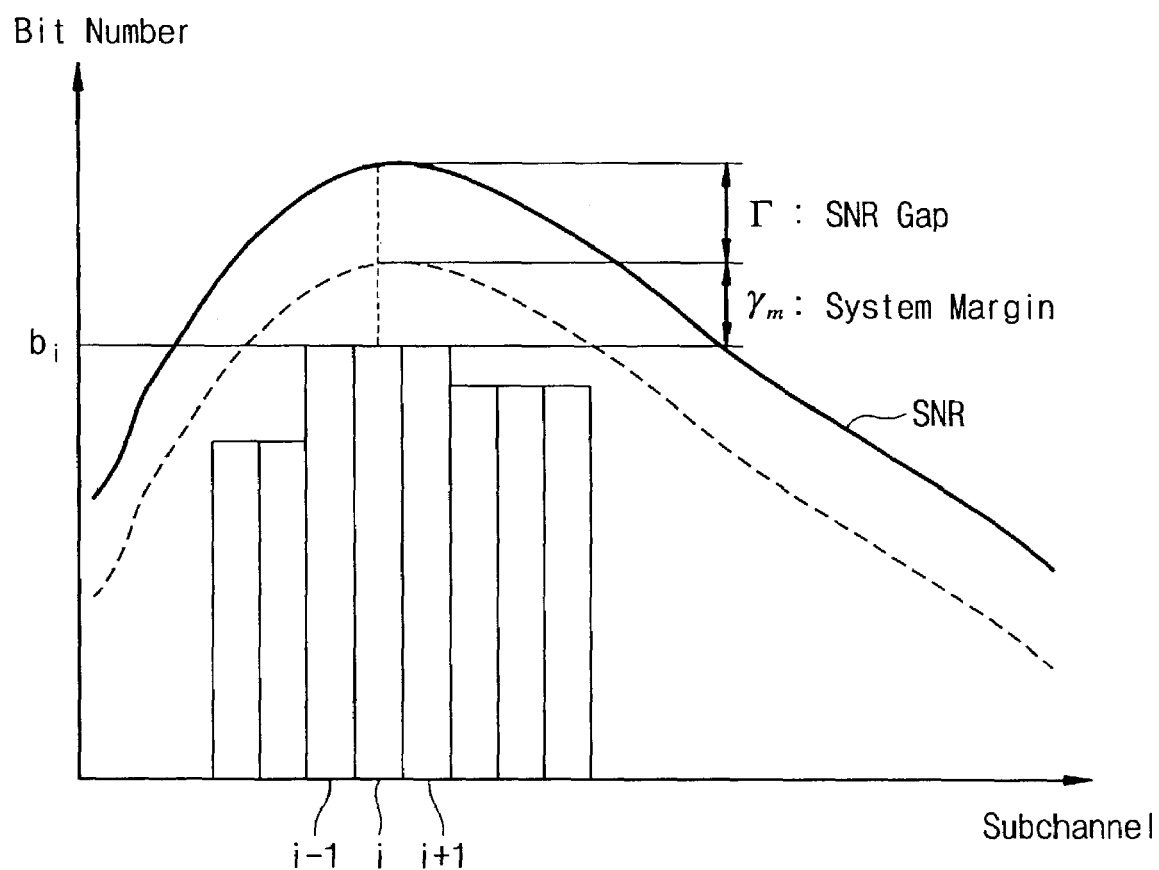
FIG. 2 is an exemplary diagram illustrating SNR of a multi-channel communication system.

FIG. 2 is an exemplary diagram illustrating SNR of a multi-channel communication system. In FIG. 2, the solid line represents SNRs for subchannels, and $b_i$ is the greatest allocable bit number of the ith subchannel. The variable $b_i$ should be an integer and, especially in ADSL or VDSL system, $b_i$ should be more than 1 ($b_i > 1$). But, in G.DMT.BIS of the ADSL system, it should be possible that $b_i$ is equal to 1 ($b_i = 1$) so as to perform one-bit loading.

In Equations (1) and (2), $b_i$ should be an integer. Accordingly, even if the bit loading is performed with a system margin $Y_m$, a system margin of each subchannel may be more than $Y_m$. To solve the problem that the system margin is variable to each subchannel, a fine-tuning process according to the invention is preferably performed as discussed in detail below.

In an ADSL or a VDSL system, the target bit number $B_{target}$ according to the desired data rate is not set to be equal to the total bit number $B_{max}$ that is obtainable from the system SNR, to limit data rate according to ranks of users. In other words, there is always a difference between $B_{target}$ and $B_{max}$. Consequently, the bit allocation algorithms can require a significant amount of computation (and thus processing time) to perform bit allocation. Therefore, a reduction in the number of computations of the algorithm can optimize the performance of the ADSL or VDSL system.

Advantageously, in accordance with one aspect of the invention, $B_{max}$ is preferably adjusted such that there is little difference between $B_{target}$ and $B_{max}$ at the beginning of the bit allocation process. As explained in detail below, this is preferably achieved by adjusting a system margin $Y_m$ that is required for the bit loading.

An ADSL or VDSL system measures characteristics of a given communication channel and determines a data rate by using the measured result. The SNR of the communication channel for determining the data rate is obtained by using a MEDLEY signal. The MEDLEY signal is a signal obtained by expanding a REVERB signal that is a pseudo-random signal. While the REVERB signal is a periodic signal, the MEDLEY signal may be recognized as a non-periodic signal. Also, because a cyclic prefix is added to a transceiving signal between a central office and remote terminals, an intersymbol interference, an interchannel interference, and a channel noise characteristic of the entire system may influence the SNR.

After measuring the SNR of the entire system, a bit allocation table for encoding and decoding is written to enable transceiving of a data signal. Methods for allocating bits to each subchannel based on the SNR and the entire system margin will be now described in detail.

Figure 3:
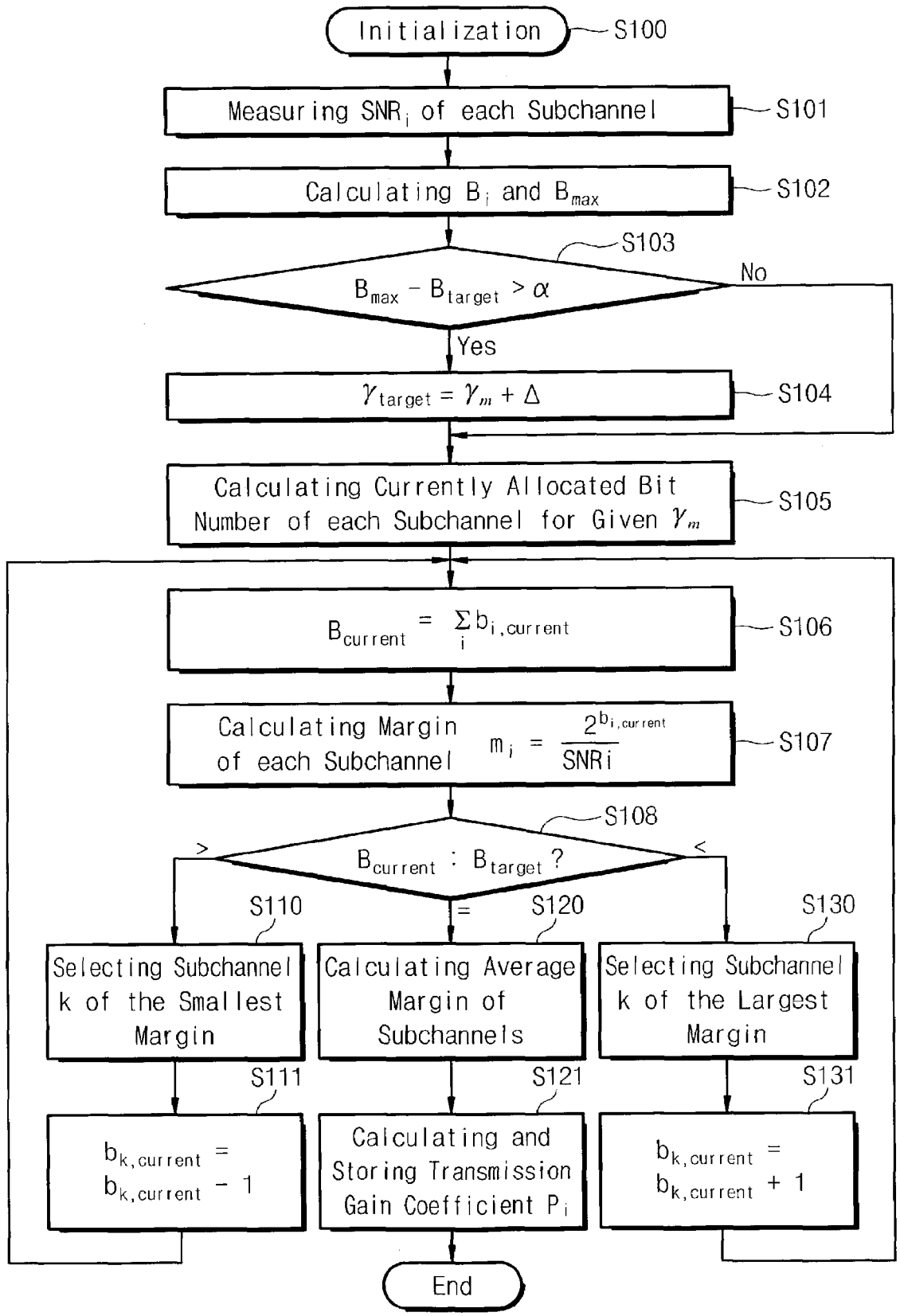
FIG. 3 is a flowchart illustrating a bit allocation method according to an embodiment of the invention.

FIG. 3 is a flowchart of a bit allocation method according to one aspect of the invention. The method of FIG. 3 is preferably implemented in the system of FIG. 1. Initially, in S100, a target bit rate $R_{target}$ is initialized according to a target bit error rate $P_e$. In a typical ADSL system, the $R_{target}$ is more than 6 Mbps and the $P_e$ is $10^{-7}$. The sum of the bits allocated to the subchannels based on a given $R_{target}$ (i.e., the target bit number) is determined by the equation $B_{target} = R_{target}/R_{symbol}$, where the term $R_{symbol}$ is a source symbol rate. In the T1E1.413 standard, $R_{symbol}$ is 4 kHz.

In S101, SNRs for each of the subchannels are measured using standard routines, which are specified by the T1E1.413, where the output spectrum density for each subchannel is set to a constant of −40 dBm/Hz downstream and −38 dBm/Hz upstream. According to these standard routines, in the initialization process for a multi-channel communication system, the central office transmits a MEDELY signal to remote terminals. The bit allocator 11 of the remote terminal compares the MEDELY signal received from the central office with the MEDELY signal stored in the bit allocator 11, and calculates SNRi (i=0, 1, 2, . . . , N) for each subchannel from differences therebetween.

In S102, the bit allocator 11 calculates the greatest allocable bit number $b_i$ of each subchannel and then calculates the sum $B_{max}$ of the greatest allocable bit numbers of the subchannels, using Equations (1) and (2).

In S103, it is determined whether a difference between the sum $B_{max}$ of the greatest allocable bit numbers of the subchannels and the target bit number $B_{target}$ is more than a predetermined value $\alpha$. If a difference between $B_{max}$ and $B_{target}$ is more than a predetermined value $\alpha$, the control proceeds with S104. Otherwise, the control proceeds with S105.

In Equation (1), since the system margin $Y_m$ is a given value, a system margin $Y_i$ of each subchannel according to the greatest allocable bit number of each subchannel is preferably defined as follows:

$$\gamma_i = \frac{SNR_i}{(2^{b_i} - 1)\Gamma}, i = 0, 1, 2, \cdots, N \quad (3)$$

Furthermore, the average system margin $Y_m$ of the subchannels is preferably defined as follows:

$$\gamma_m = \frac{1}{N}\sum_{i=0}^{N}\frac{SNR_i}{(2^{bi}-1)\Gamma}, \quad i = 0, 1, 2, \cdots, N \quad (4)$$

That is, the system margin $Y_m$ is preferably obtained by calculating the average value of the system margins $Y_i$ of each of the subchannels. Equation (4) may be represented in dB as follows:

$$\gamma_m = \frac{10}{N}\log_{10}\left(\sum_{i=0}^{N} SNR_i\right) - \Gamma - \frac{10}{N}\sum_{i=0}^{N}\log_{10}(2^{bi}-1) \quad (5)$$

$$\cong \frac{10}{N}\log_{10}\left(\sum_{i=0}^{N} SNR_i\right) - \Gamma - \frac{10}{N}\sum\log_{10}(2^{bi})$$

$$= \frac{10}{N}\log_{10}\left(\sum_{i=0}^{N} SNR_i\right) - \Gamma - \frac{10\log_{10}2}{N}\sum_{i=0}^{N} b_i$$

$$= \frac{10}{N}\log_{10}\left(\sum_{i=0}^{N} SNR_i\right) - \Gamma - \frac{10\log_{10}2}{N}B_{max}$$

Equation (5) illustrates a correlation between the total bit number $B_{max}$ allocable by the SNR of the system and the average system margin $Y_m$. Similarly, if the target system margin for the target bit number $B_{target}$ is $Y_{target}$, $Y_{target}$ is preferably defined as follows:

$$\gamma_{t\,arg\,et} = \frac{10}{N}\log_{10}\left(\sum_{i=0}^{N} SNR_i\right) - \Gamma - \frac{10\log_{10}2}{N}B_{t\,arg\,et} \quad (6)$$

Comparing Equations (5) and (6) illustrates that the difference between the average system margin $Y_m$ and the target system margin $Y_{target}$ is proportional to the difference between the sum $B_{max}$ of the greatest allocable bit number and the target bit number $B_{target}$. Accordingly, when the difference between $B_{max}$ and $B_{target}$ is more than a predetermined value $\alpha$, the currently allocated bit number of each subchannel is set to a value that is reduced from the greatest allocable bit number $b_i$ by a constant ratio. If the difference between $B_{max}$ and $B_{target}$ is less than (or equal to) a predetermined value $\alpha$, the currently allocated bit number of each subchannel is set to the greatest allocable bit number $b_i$.

More specifically, referring again to FIG. 3, in S104, the system margin is calculated using the equation $Y_{target} = Y_m + \Delta$, so that the currently allocated bit number of each subchannel can be set to a value that is reduced from the greatest allocable bit number $b_i$ by a constant ratio. Here, $\Delta = Y_{target} - Y_m$. The value $\Delta$ is preferably determined using Equations (5) and (6) and is preferably defined as follows:

$$\Delta \approx \frac{10\log_{10}2}{N}(B_{max} - B_{t\,arg\,et}) \quad (7)$$

In Equation (7), when $10\log_{10}2 \approx 2^2$, N may be represented as the power of 2. Thus, $\Delta$ can be readily obtained by calculating the value of $B_{max} - B_{target}$ and then multiplying the resultant value by $2^{2-\log_2 N}$, which is a simple calculation.

In S105, the bit allocator 11 calculates the currently allocated bit number $b_{i,\,current}$ of each subchannel. If the difference between the sum $B_{max}$ of the greatest allocable bit numbers of the subchannels and the target bit number $B_{target}$ is more than a predetermined value $\alpha$, $b_{i,\,current}$ is preferably determined as follows:

$$b_{i,current} = \log_2\left(1 + \frac{SNR_i}{\Gamma(\gamma_m + \Delta)}\right), \quad i = 0, 1, 2, \cdots, N \quad (8)$$

On the other hand, if a difference between $B_{max}$ and $B_{target}$ is less than (or equal to) a predetermined value $\alpha$, then $b_{i,\,current}$ is preferably determined as follows:

$$b_{i,current} = \log_2\left(1 + \frac{SNR_i}{\Gamma\gamma_m}\right), \quad i = 0, 1, 2, \cdots, N \quad (9)$$

In S106, the sum $B_{current}$ of the currently allocated bit number of the subchannels is preferably determined as follows:

$$B_{current} = \sum_i b_{i,current} \quad (10)$$

In S107, a margin $m_i$ of each subchannel is preferably determined as follows:

$$m_i = \frac{2^{b_{i,current}}}{SNR_i}, \quad i = 0, 1, 2, \cdots, N \quad (11)$$

That is, under the same SNR, while the margin is reduced for a subchannel having a high allocated bit number, the margin is increased for a subchannel having a low allocated bit number. In addition, it is to be noted that Equation (11) is essentially a reciprocal number of Equation (3). More specifically, when a predetermined bit number is allocated to a given subchannel, the margin $m_i$ is an approximate value of a difference between the predetermined bit number and the measured SNR. Accordingly, if the margin $m_i$ is large, the system margin of the subchannel is large. On the other hand, if the margin $m_i$ is small, the system margin of the subchannel is small and the subchannel has a relatively poor noise characteristic as compared to other subchannels.

In S108, the sum of the currently allocated bit numbers $B_{i,\,current}$ of the subchannels is compared with the target bit number $B_{target}$. As a result, if $B_{i,\,current}$ is more than $B_{target}$, the control proceeds with S110. In S110, the bit allocator 11 compares margins $m_i$ of each channel and selects a subchannel k having the smallest margin. In S111, the bit allocator 11 decreases the allocated bit number of the selected subchannel k by 1. Then, the control returns to S106.

As a result of the comparison in S108, if $B_{i,\,current}$ is less than $B_{target}$, the control proceeds with S130. In S130, the bit allocator 11 compares margins $m_i$ of each channel and selects a subchannel k having the largest margin. In S131, the bit allocator 11 increases the allocated bit number of the selected subchannel k by 1. Then, the control returns to S106.

The foregoing processing is performed until the sum of the currently allocated bit numbers $B_{i,\,current}$ of the subchannels is equal to the target bit number $B_{target}$. According to the present invention, margins of most subchannels are set to be similar. However, there arises a difference between the total system margin and each system margin. As a result, it cannot be ensured that a bit error rate of each subchannel is $10^{-7}$. To solve such a problem, an optimum algorithm according to the present invention is preferably implemented, which makes it possible to render the margins of all subchannels conformal by adjusting transmission power. For example, optimization can be achieved by decreasing the transmission power of a subchannel having a large margin by a remaining margin and/or increasing the transmission power of a subchannel having a small margin by a deficient margin.

Figure 4:
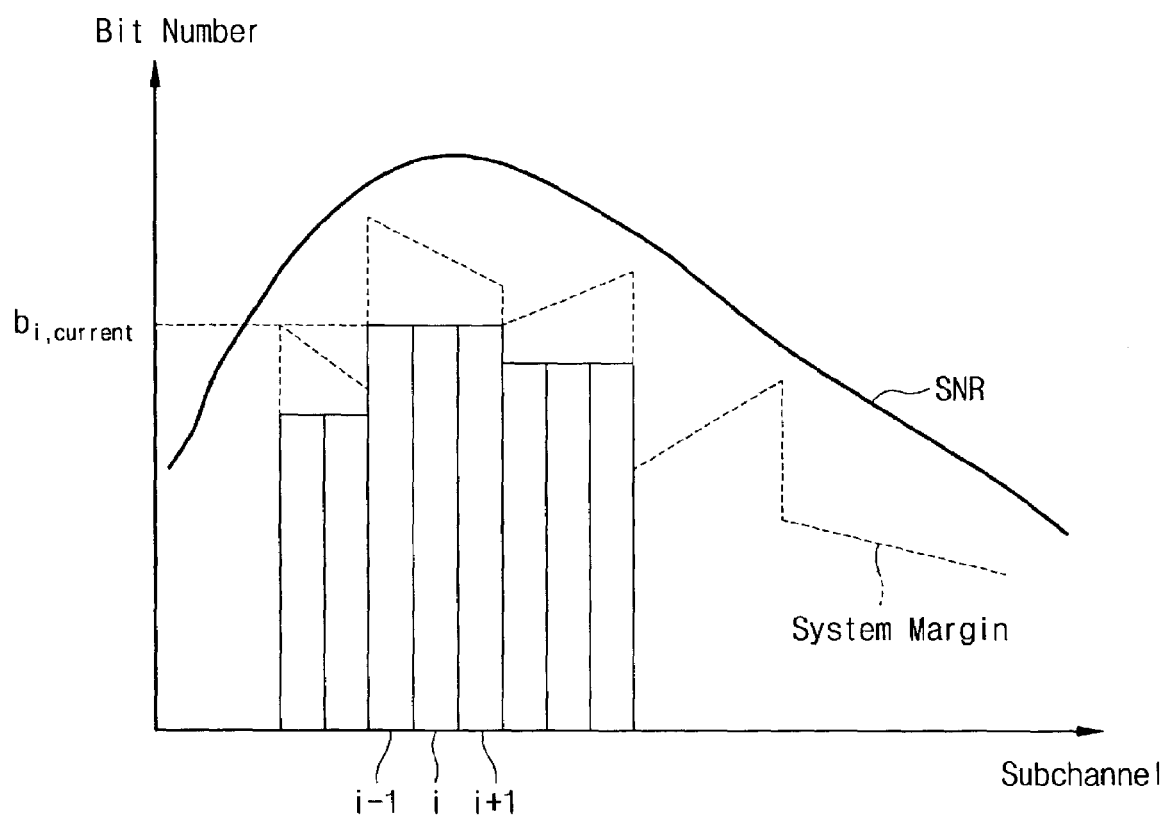
FIG. 4 is an exemplary diagram illustrating a margin distribution of each subchannel that can be obtained using a bit allocation method of the present invention.

FIG. 4 is an exemplary diagram illustrating a margin distribution of each subchannel that results from a bit allocation method according to the present invention. Referring to FIG. 4, because the allocated bit number of each subchannel should be an integer, the system margin of each subchannel may be larger or smaller than the sum of a SNR gap and the given system margin $Y_m$. In the case that the calculation result of Equation (1) is a real number without an integer, the result should be rounded to allocated bits of an integer. In other words, if the bit number that is an integer more than the result of Equation (1) is allocated to a subchannel, a margin of the subchannel becomes smaller than the given system margin $Y_m$. Also, if the bit number that is an integer less than the result of Equation (1) is allocated to a subchannel, a margin of the subchannel becomes larger than the given system margin $Y_m$. The margins of each of the subchannels may be implied in the margin function $m_i$ as defined above. In FIG. 4, the broken line represents the system margin $m_i$ of the subchannels. That is, a system margin $m_i$ of each subchannel is obtained by a ratio of a measured system $SNR_i$ and the number of allocated bits. Thus, a system margin $m_i$ of each subchannel has a different slope from the system SNR (indicated in FIG. 4 by the solid line).

The present invention advantageously provides a method for fine-tuning the transmission power if the subchannels have different margins, to thereby make the margins of the subchannels to be the same (or substantially conformal). More specifically, referring again to FIG. 3, as a result of the comparison of S108, if the sum of the currently allocated bit numbers $B_{i,\ current}$ of the subchannels is equal to the target bit number $B_{target}$, the control proceeds with S120. In S120, the bit allocator 11 calculates an average margin $Y_{system}$ of the subchannels. The average margin $Y_{system}$ is preferably defined as follows:

$$\gamma_{system} = \frac{1}{N} \sum_i m_i \quad (12)$$

That is, the average margin of the subchannels becomes a margin of the entire system.

In S121, the bit allocator 11 calculates a transmission gain coefficient $p_i$ of each subchannel. To set margins of each of the subchannels to be the same, the system margin (as determined by Equation (12)) is compared with a margin of each subchannel, and a transmission power of each subchannel may be increased or decreased by a difference between the system margin and the margin of each subchannel. The transmission gain coefficient $p_i$ of each subchannel is preferably defined as follows:

$$p_i = \sqrt{m_i - \gamma_{system}} \quad (dB) \quad (13)$$

The transmission gain coefficient $p_i$ calculated by the bit allocator 11 is stored in the transmission gain table 13. The transmission gain table 13 can fine-tune the transmission power in the subchannels by multiplying the transmission gain coefficient $p_j$ of the $i^{th}$ subchannel by the transmission power of the $i^{th}$ subchannel generated from the QAM encoder 12.

Figure 5:
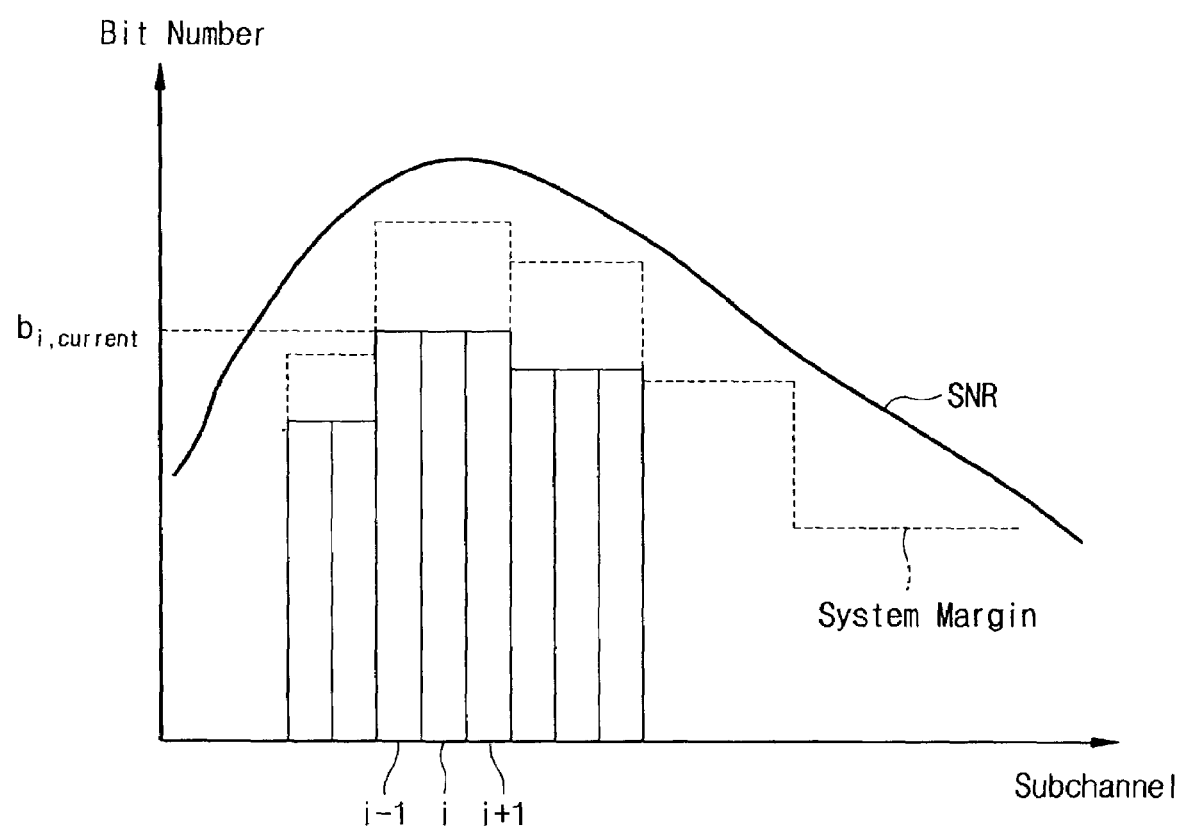
FIG. 5 is an exemplary diagram illustrating a margin distribution of each subchannel that can be obtained using a bit allocation method according to the invention that includes fine-tuning of transmission powers.

FIG. 5 is an exemplary diagram illustrating the resulting margin that can be obtained by adjusting the transmission power in the subchannels, according to the invention. As shown in FIG. 5, margins of each of subchannels become conformal regardless of the number of bits allocated based on a given system SNR. As a result, a margin of each subchannel becomes the same as a margin of the entire system. In other words, all subchannels can meet a desired bit error rate, and a transceiving bit allocation and a transceiving power of the multi-channel communication system may be set to the optimum state.

It is to be appreciated that the methods described herein may be performed by a digital signal processor (DSP). The calculated results may be stored in memory devices such as a random access memory (RAM).

In summary, a bit allocation method according to the invention provides a reduction in the number of computations and processing time needed for allocating bits to various subchannels, as compared to conventional bit allocation methods. In general, to provide a reduction in the number of computations and the processing time, an allocated bit number of each subchannel is determined based on a given system SNR and a given system margin. When there arises a difference between a total bit number (the sum of the allocated bit numbers for the channels) and a desired (target) bit number, the allocated bit number of one or more channels is adjusted by one bit in consideration of a system margin. Consequently, a large amount of calculations that may be needed when initially performing a bit loading algorithm can be markedly reduced using the methods of the present invention. Accordingly, using a bit allocation method of the present invention, a multi-channel communication system may have a desired total bit number with a given system SNR in a limited time.

Furthermore, the invention provides a method for adjusting the transmission power of each subchannel such that the system margin of each subchannel is set to be the same. Consequently, all subchannels can meet a desired bit error rate, and a transceiving bit allocation and a transceiving power of the multi-channel communication system may be set to the optimum state.

Although illustrative embodiments have been described herein with reference to the accompanying drawings, it is to be understood that the present invention is not limited to those precise embodiments, and that various other changes and modifications may be affected therein by one skilled in the art without departing from the scope and spirit of the invention. All such changes and modifications are intended to be included within the scope of the invention as defined by the appended claims.

What is claimed is:

1. A method for performing bit allocation in a multi-channel communication system, comprising the step of:

measuring a signal-to-noise ratio (SNR) of each subchannel of a channel;

determining a greatest allocable bit number of each subchannel using the measured SNR of the subchannels, and determining a sum of the greatest allocable bit numbers of the subchannels;

determining a difference between the sum of the greatest allocable bit numbers of the subchannels and a target bit number;

for each subchannel, setting a currently allocated bit number of the subchannel equal to the greatest allocable bit number of the subchannel, if the difference between the sum of the greatest allocable bit numbers an the target bit number is less than or equal to a predetermined value;

for each subchannel, setting a currently allocated bit number of the subchannel to a value that is reduced from the greatest allocable bit number of the subchannel by a predetermined ratio, if the difference between the sum of the greatest allocable bit numbers and the target bit number is greater than the predetermined value; and adjusting the currently allocated bit numbers of one or more subchannels until a sum of the currently allocated bit numbers is equal to the target bit number.

2. The method of claim 1, wherein the step of adjusting the currently allocated bit number of one or more subchannels comprises the steps of:

for each subchannel, determining a margin of the subchannel using the currently allocated bit number and the SNR of the subchannel;

comparing the sum of the currently allocated bit numbers with the target bit number;

if the sum of the currently allocated bit numbers is greater than the target bit number, selecting the subchannel having the smallest margin; and reducing a number of the currently allocated bits of the selected subchannel by 1.

3. The method of claim 1, wherein the step of adjusting the currently allocated bit number of one or more subchannels comprises the steps of:

for each subchannel, determining a margin of the subchannel using the currently allocated bit number and the SNR of the subchannel;

comparing the sum of the currently allocated bit numbers with the target bit number;

if the sum of the currently allocated bit numbers is less than the target bit number, selecting the subchannel having the greatest margin; and increasing a number of the currently bits of the selected subchannel by 1.

4. The method of claim 1, further comprising the steps of:

for each subchannel, determining a margin of the subchannel using the currently allocated bit number and the SNR of the subchannel;

comparing the sum of the currently allocated bit numbers with the target bit number;

if the sum of the currently allocated bit numbers is equal to the target bit number, determining an average margin of the subchannels; and for each subchannel, determining a transmission gain coefficient of the subchannel using a difference measure between the margin of the subchannel and the average margin of the subchannels.

5. A method for performing bit allocation in a multichannel communication system, comprising the steps of:

measuring a signal-to-noise ratio (SNR) of each subchannel of a channel;

determining a greatest allocable bit number of each subchannel using the measured SNR of the subchannels, and determining a sum of the greatest allocable bit numbers of the subchannels;

determining a difference between the sum of the greatest allocable bit numbers of the subchannels and the target bit number;

adjusting a system margin, if the difference between the sum of the greatest allocable bit numbers and the target bit number is more than a predetermined value;

determining a currently allocated bit number for each subchannel using the system margin; and adjusting the currently allocated bit number of one or more subchannels until a sum of the currently allocated bit numbers of the subchannels is equal to the target bit number; wherein the step of adjusting the system margin comprises adding a value of $\Delta$ to the system margin, wherein $$\Delta \approx \frac{10\log_{10}2}{N}(B_{\max} - B_{target}),$$

wherein the $B_{max}$ is the sum of the greatest allocable bit numbers, $B_{target}$ is the target bit number, and N is the number of subchannels.

6. The method of claim 5, wherein the currently allocated bit number of an $i^{th}$ subchannel is $$bc_i = \log_2\left(1 + \frac{SNR_i}{\Gamma \gamma_m}\right),$$

wherein the $SNR_i$ is the SNR of the $i^{th}$ subchannel, $Y_m$ is the system margin and wherein $\Gamma$ is a SNR gap.

7. The method of claim 5, wherein the step of adjusting the currently allocated bit number of one or more subchannels comprises the steps of:

for each subchannel, determining a margin of the subchannel using the currently allocated bit number and the SNR of the subchannel;

comparing the sum of the currently allocated bit numbers with the target bit number;

if the sum of the currently allocated bit numbers is greater than the target bit number, selecting the subchannel having the smallest margin; and reducing the currently allocated bit number of the selected subchannel by 1.

8. The method of claim 5, wherein the step of adjusting the currently allocated bit number of one or more subchannels comprises the steps of:

for each subchannel determining a margin of the subchannel using the currently allocated bit number and the SNR of the subchannel;

comparing the sum of the currently bit numbers with the target bit number;

if the sum of the currently allocated bit numbers is less than the target bit number, selecting the subchannel having the largest margin; and increasing the currently allocated bit number of the selected subchannel by 1.

9. The method of claim 7, wherein the margin $m_i$ for an $i^{th}$ subchannel $$m_i = \frac{2^{bc_i}}{SNR_i},$$

where $bc_i$ is the currently allocated bit number and $SNR_i$ is the SNR of the $i^{th}$ subchannel.

10. A method for performing bit allocation in a multi-channel communication system, comprising the steps of:
   measuring a signal-to-noise ratio (SNR) of each subchannel of a channel;
   determining a greatest allocable bit number of each subchannel using the measured SNR of the subchannels, and determining a sum of the greatest allocable bit numbers of the subchannels;
   determining a difference between the sum of the greatest allocable bit numbers of the subchannels and a target bit number;
   for each subchannel, setting a currently allocated bit number of the subchannel equal to the greatest allocable bit number of the subchannel, if the difference between the sum of the greatest allocable bit numbers and the target bit number is less than or equal to a predetermined value;
   for each subchannel, setting a currently allocated bit number of the subchannel to a value that is reduced from the greatest allocable bit number of the subchannel by a predetermined ratio, if the difference between the sum of the greatest allocable bit numbers and the target bit number is greater than the predetermined value;
   adjusting the currently allocated bit numbers of one or more subchannels until a sum of the currently allocated bit numbers is equal to the target bit number; and
   adjusting a transmission power of one or more subchannels to make a margin of each of the subchannels substantially conformal.

11. The method of claim 10, wherein the step of adjusting the transmission power of one or more subchannels comprises the steps of:
   for each subchannel, determining the margin of the subchannel using the currently allocated bit number and the SNR of the subchannel;
   determining an average margin of the subchannels; and
   for each subchannel, determining a transmission gain coefficient of the subchannel using a measure of a difference between the margin of the subchannel and the average margin.

12. The method of claim 11, wherein the margin $m_i$, for an $i^{th}$ subchannel is $$m_i = \frac{2^{bc_i}}{SNR_i},$$

where $bc_i$ is the currently allocated bit number and $SNR_i$ is the SNR of the $i^{th}$ subchannel.

13. The method of claim 12, wherein the average margin of the subchannels is $\gamma_{system} = \frac{1}{N}\sum_i m_i$.

14. The method of claim 13, wherein the transmission gain coefficient $p_i$ of an $i^{th}$ subchannel is $$p_i = \sqrt{m_i - \gamma_{system}} \quad (\text{dB}).$$

15. A multi-channel communication device, comprising:
   a transmitter for transmitting data over a channel comprising a plurality of subchannels,
   the transmitter comprising a bit allocation module for performing bit allocation for the subchannels, the bit allocation module comprising:
   means for measuring a signal-to-noise ratio (SNR) of each subchannel of a channel;
   means for determining a greatest allocable bit number of each subchannel using the measured SNR of the subchannels, and determining a sum of the greatest allocable bit numbers of the subchannels;
   means for determining a difference between the sum of the greatest allocable bit numbers of the subchannels and a target bit number;
   means for setting a currently allocated bit number of each subchannel to be equal to the greatest allocable bit number of the subchannel, if the difference between the sum of the greatest allocable bit numbers and the target bit number is less than or equal to a predetermined value, and for setting a currently allocated bit number of each subchannel to a value that is reduced from the greatest allocable bit number of the subchannel by a predetermined ratio, if the difference between the sum of the greatest allocable bit numbers and the target bit number is greater than the predetermined value; and
   means for adjusting the currently allocated bit numbers of one or more subchannels until a sum of the currently allocated bit numbers is equal to the target bit number.

16. The device of claim 15, wherein the bit allocation module further comprises:
   means for determining a margin of each subchannel using the currently allocated bit numbers and the SNRs of the subchannels;
   means for determining an average margin of the subchannels; and
   means for determining a transmission gain coefficient of each subchannel, wherein the transmission gain coefficient for a given subchannel is determined using a measure of a difference between the margin of the subchannel and the average margin.

17. The device of claim 16, wherein the transmitter further comprises a transmission power adjustment module for adjusting the transmission power of a subchannel using the transmission gain coefficient of the subchannel.

18. The device of claim 17, wherein the transmission power adjustment module comprises a transmission gain table that stores the transmission gain coefficients determined by the bit allocation module.

* * * * *